(12) United States Patent
Kritt et al.

(10) Patent No.: US 9,990,409 B2
(45) Date of Patent: Jun. 5, 2018

(54) INTERACTIVE FORMAT MANIPULATION AND REPLICATION

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 14/025,022

(22) Filed: Sep. 12, 2013

(65) Prior Publication Data

US 2015/0019489 A1 Jan. 15, 2015

Related U.S. Application Data

(63) Continuation of application No. 13/942,386, filed on Jul. 15, 2013.

(51) Int. Cl.
*G06F 17/30* (2006.01)
*G06F 17/21* (2006.01)

(52) U.S. Cl.
CPC ...... *G06F 17/30569* (2013.01); *G06F 17/211* (2013.01)

(58) Field of Classification Search
None
See application file for complete search history.

(56) References Cited

U.S. PATENT DOCUMENTS

| 7,480,861 | B2 | 1/2009 | Yalovsky et al. |
| 7,603,619 | B2 | 10/2009 | Baugher |
| 2003/0174174 | A1* | 9/2003 | Fitzpatrick ............ G06F 3/0482 715/809 |
| 2004/0088653 | A1* | 5/2004 | Bell et al. .................... 715/523 |
| 2009/0292987 | A1* | 11/2009 | Sorenson .................... 715/255 |
| 2012/0030378 | A1* | 2/2012 | Kaila .................. H04L 67/1095 709/248 |

OTHER PUBLICATIONS

Copying and Pasting Formats, OriginLab, Feb. 2013.

* cited by examiner

*Primary Examiner* — Mark D Featherstone
*Assistant Examiner* — Ranjit P Doraiswamy
(74) *Attorney, Agent, or Firm* — Lieberman & Brandsdorfer, LLC

(57) ABSTRACT

Selectively applying format attributes of a source to the content of a destination. The format attributes defining the format of one or more source objects are captured, and from among the captured attributes, format attributes are selected. A destination object is formatted such that selected format attributes are copied to the content of the destination, and the copied format attributes are applied to the destination object as a destination format.

6 Claims, 7 Drawing Sheets

INTERACTIVE FORMAT MANIPULATION AND REPLICATION

CROSS REFERENCE TO RELATED APPLICATION(S)

This application is a continuation patent application claiming the benefit of the filing date of U.S. patent application Ser. No. 13/942,386 filed on Jul. 15, 2013 and titled "Interactive Format Manipulation and Replication," which is hereby incorporated by reference.

BACKGROUND

Technical Field

The present invention relates to data format manipulation. More specifically, the invention relates to selective application of format components to a destination.

Background

It is understood that formatted source data may include one or more format characteristics that contribute to the appearance and presentation of the source data. Copying the format of the source, and applying it to a destination is a common functionality in documenting and data editing. Using this functionality, a user can copy the format from the source and replace the format of the destination with the copied format.

SUMMARY OF THE INVENTION

This invention comprises a method for data format manipulation.

In one aspect, a method is provided for applying selected format attributes to a destination. One or more first attributes defining a format for a first source having a first original format are captured. A destination different from the first source is selected for application of at least one of the captured first attributes. Specifically, one or more of the captured attributes of the format are selectively copied to content of the destination, such that the content of the destination is formatted. The selected attributes are then applied to the content as a destination format.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
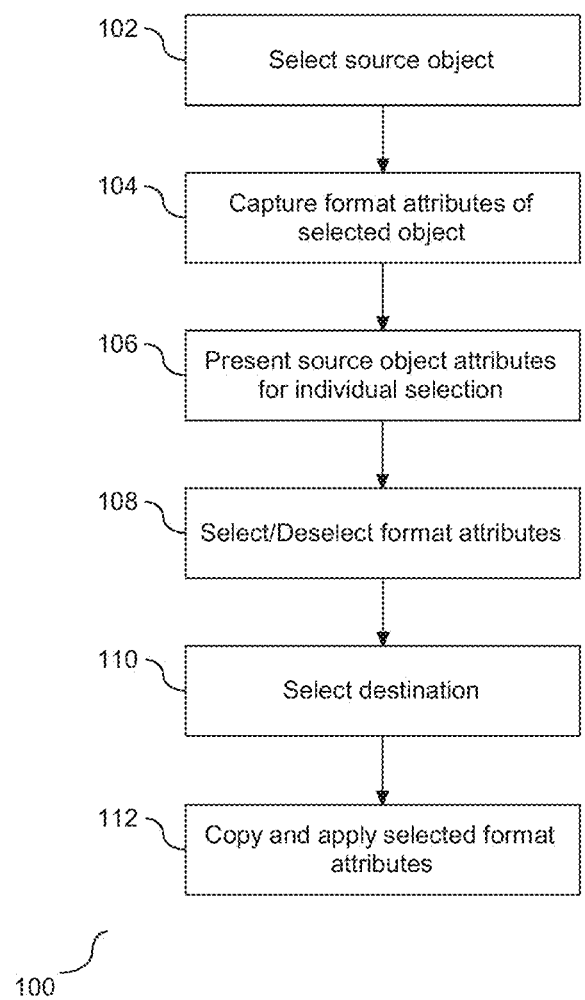
FIG. 1 depicts a flow chart illustrating a method for applying selected format attributes to destination content.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Various mediums implement software to display objects having an encoded format. An object having one or more format attributes for selection is hereafter referred to as a source object. Similarly, an object to which one or more selected format attributes is applied is hereafter referred to as a destination object. In one embodiment, a destination object in one particular instance may be a source object in a different instance, and conversely a source object in one particular instance may be a destination object in a different instance, depending on the functionality of the object at a given time. Accordingly, one or more format attributes of a source object are applied to a destination object.

To enable versatility in replicating formats from one or more source objects, format attributes of a source object, hereinafter referred to as source, may be selectively applied from the source object to a destination object hereinafter referred to as destination. FIG. 1 is a flowchart (100) illustrating a method for applying selected format attributes from the source to the destination. The use of the term object is not limited to textual data and in one embodiment may include data content or an equivalent thereof. The source object is selected (102) and the format attribute(s) of the selected source is captured (104). The source may have one or more attributes that contribute to the formatting and/or presentation of the object. The format attribute(s) of the source is presented in a manner so that each attribute may be individually selected (106). In one embodiment, each format attribute is initially selected for replication to the destination, and the attributes may be individually de-selected. De-selection of any one of the attributes excludes the de-selected attribute from application to the destination. In one embodiment, the inverse may apply where format attributes of the source are originally unselected and attributes for application to the destination are actively selected. Accordingly, upon selection of the source, one or more attributes of the selected source is captured and presented for selection and application to the destination.

Following the attribute presentation, each captured attribute is individually, and in one embodiment, independently selected or de-selected, thereby creating a positive identification of attributes for application (108). Similarly, one or more destinations are selected (110). The positively identified attribute(s) is applied to the selected destination (112). In one embodiment, the destination is highlighted text and/or a data cell block. Accordingly, a selectable format attribute of one or more sources is applied to one or more destinations.

Figure 2:
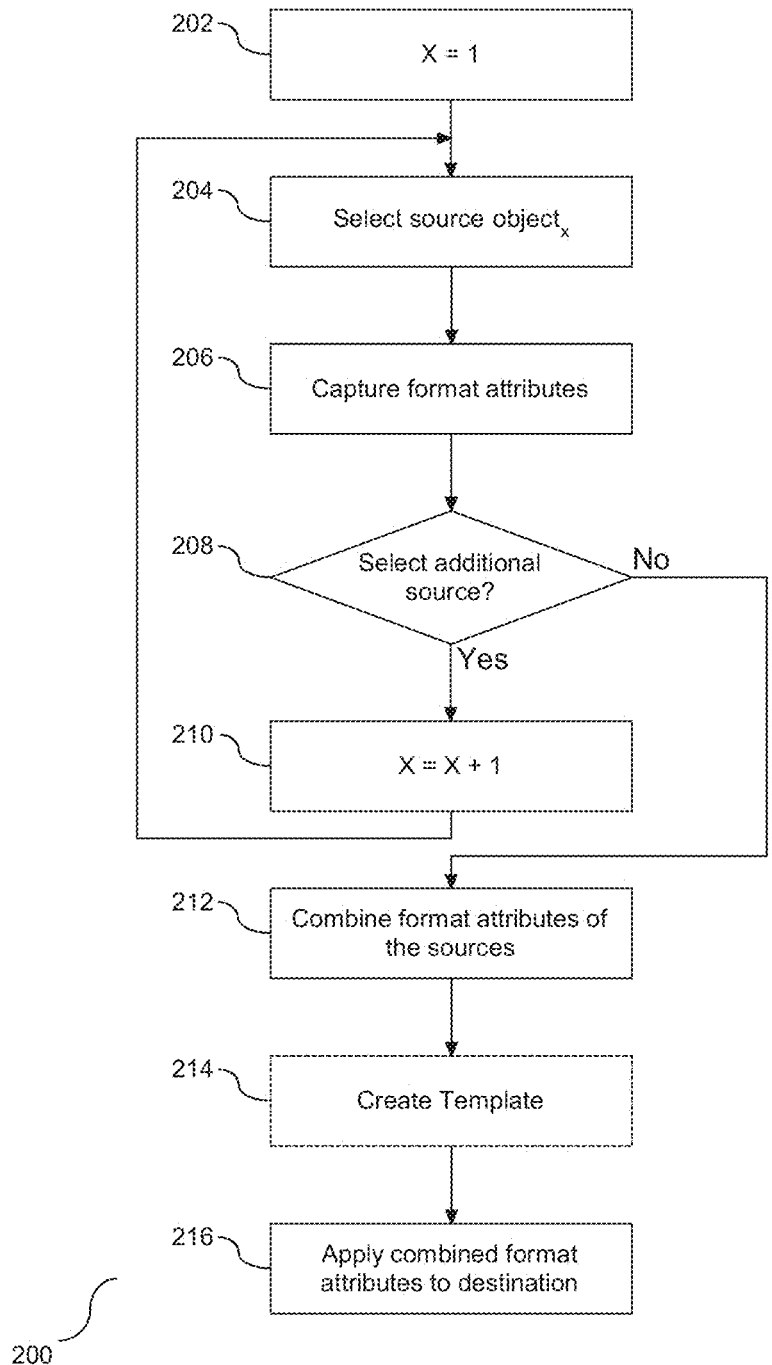
FIG. 2 depicts a flow chart illustrating a method for applying selected format attributes from multiple sources to destination content.

Captured and selected format attributes are not necessarily limited to one selected source, as shown in FIG. 1. One or more attributes from two or more sources may be selectively applied to one or more destinations. FIG. 2 is a flow chart (200) illustrating a method for capturing attributes from two or more sources and applying a combination of the captured attributes from the multiple sources to a destination. A variable x is initialized (202) and $source_x$ is selected (204). Each source includes one or more attributes that characterize the visual presentation of the destination. Selected $source_x$ has one or more attributes that define the format. Attributes for $source_x$ are captured (206). Following the attribute capture at step (206), it is determined whether attributes from another source will be selected for application (208). In one embodiment, the act of selecting a second or subsequent source may take the place of the assessment demonstrated at step (206). A positive response to the determination at step (208), or the selection of a subsequent source, is followed by an increment of the counting variable x (210), followed by a return to step (204). Accordingly, for each selected source selected, format attributes of the source are selected and captured for application.

If at step (208) it is determined that a subsequent source is not selected this is an indication that all sources have been selected. Once all of the sources and their attributes have been selected or otherwise identified, the format attributes of each selected source are combined (212). In one embodiment, a template is created with the format attributes of the selected source(s) (214). The created template can be used for a future application, either once or multiple times. Benefits associated with the created template include combining multiple formatting options and embedding them in a format for future reference. In one embodiment, all the format attributes of each selected source are marked by default as selected and upon selection of an additional source format attributes from the additional source are selected to overwrite format attributes of an initially selected source. In one embodiment, all the format attributes of a selected object are marked by default as selected and upon selection of an additional source, a subset of format attributes from the additional source are selected to overwrite the format attributes. In one embodiment, all of the captured attributes, as reflected in each selected source, are identified and a merge including all of the captured attributes of each selected source is performed. Accordingly, format attributes of multiple sources may be selectively combined.

The combined format attributes of the selected sources are applied to at least one destination (216). In one embodiment, one or more destination objects are selected and the combined format attributes are applied to each selected destination. In one embodiment, the format attributes of the destination are replaced with the merged format attributes of the sources. Accordingly, attributes of two or more sources may be combined and applied to the content of a single destination.

Figure 3:
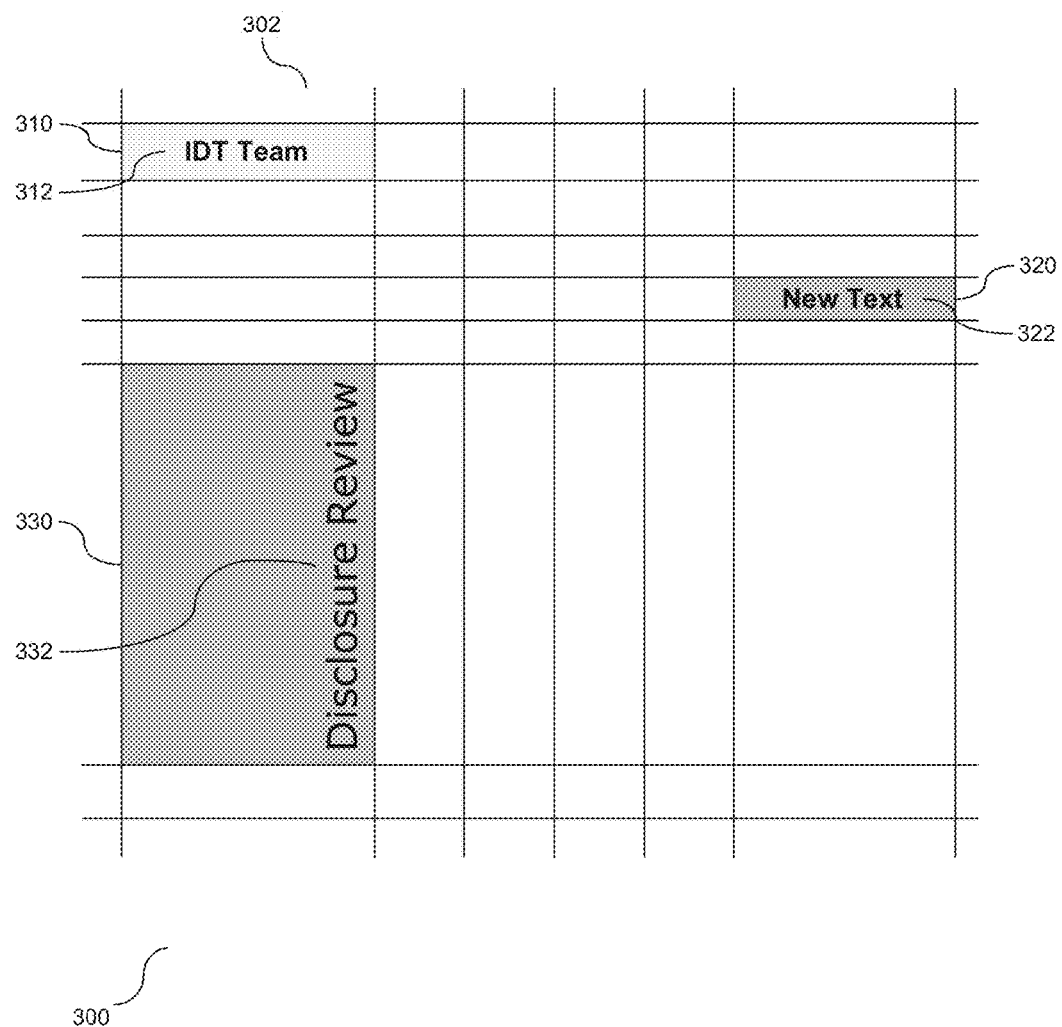
FIG. 3 depicts a block diagram illustrating one example for applying select format attributes.

FIG. 3 is a block diagram (300) illustrating one example of two selected sources and a single destination. In the example shown herein the source and destination are soft objects in a spreadsheet application. In one embodiment, the source and destination may be other forms of soft objects, such as an object of a text document. Similarly, in one embodiment, the sources may be from one or more applications and the destination(s) may be from a different application than one or more of the sources. In this example, a grid of data cells (302) in a spreadsheet is displayed.

A first source (310) for selection is displayed and is shown in this embodiment in the form of a cell having content in the form of textual data (312). The content of the first source (310) is presented with a first defined format comprised of one or more format attributes. In one embodiment, format attributes include, but are not limited to, font size, color, font style, justification, etc. A second source (320) is similarly displayed and shown in the form of a cell having content in the form of textual data (322). The content of the second source (320) is presented with a second defined format comprised of one or more format attributes. In this instance, the second source (320) is contained within a cell. The second source (320) has a defined format comprised of a combination of multiple format attributes and source content in the form of textual data (322). The attributes of the second source (320) are shown as being different from the attributes of the first source (310). In one embodiment, one or more of the attributes of the different sources may be the same, such as font size. Accordingly, two sources are displayed, each with soft content in the form of textual data.

In addition to the first and second sources, (310) and (320) respectively, a destination (330) is displayed. Specifically, the destination (330) is shown in this embodiment in the form of a cell having content in the form of textual data (312). The content of the destination (332) is presented as a combination of format attributes selected from the first source (310) and the second source (320) as described in FIG. 2. In this example, the text shade format attribute and relative size format attribute from the format of the first source (310) is combined with the background shading format attribute from the format of the second source (322). Each of these selected attributes is applied to the destination (330). Accordingly, format attributes of multiple source objects are combined and applied to at least one destination object.

Figure 4:
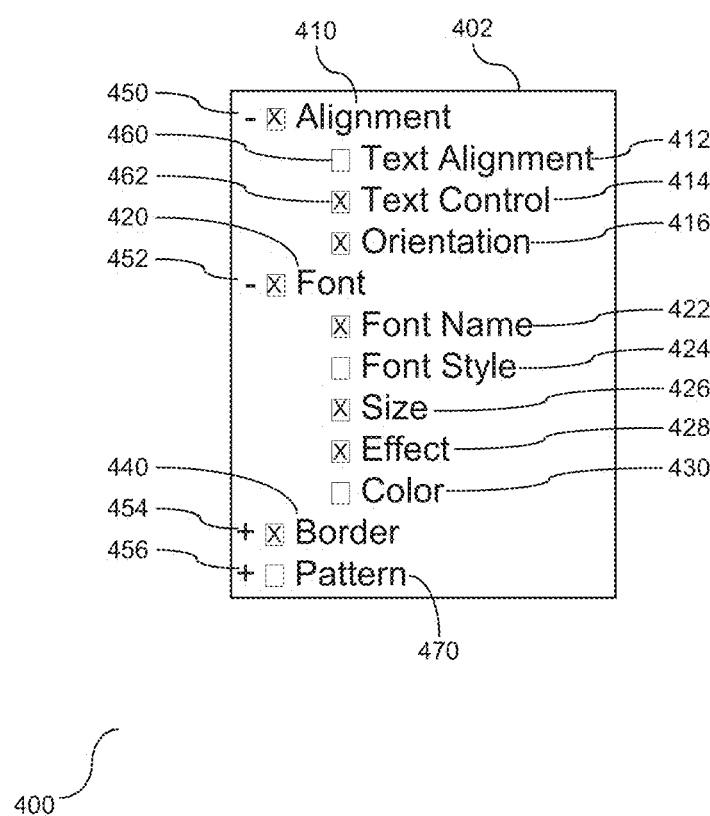
FIG. 4 depicts a block diagram illustrating one embodiment for selection and/or de-selection of format attributes.

As described in FIG. 1, format attributes may be selected and/or de-selected from a selected object for application to a destination object and associated content. FIG. 4 is a block diagram (400) illustrating an example of a window (402) enabling the selection or de-selection of object attributes. As shown, various format attributes are categorized for navigation. In this instance, example categories titled "alignment" (410), "font" (420), "border" (440), and "pattern" (470), are presented with format attributes categorized accordingly. In one embodiment, to select or de-select all format attributes in a category in a single action, the category itself may be selected. Selection of one category results in the selection of each format attribute within that category. In this example, each category and format attribute has a selectable component (460). Indicia (462) marked in any one of the boxes indicates that the corresponding category or attribute is selected while a component without marked indicia (460) indicates that the corresponding category or attribute is not selected. Accordingly, format attributes are selected through the selection of categories or individual format attributes.

In one embodiment, a user may expand or collapse the format attributes within a category. As shown in FIG. 4, the categories "alignment" (410), and "font" (420) are shown in an expanded state. In this expanded state, format attributes falling within the "alignment" and "font" category are both viewable and selectable. Specifically, the format attributes "text alignment" (412), "text control" (414), and "orientation" (416), are displayed within the "alignment" category (410), and the format attributes "font name" (422), "font style" (424), "size" (426), "effect" (428) and "color" (430) are displayed within the "font" (420) category. The "minus" symbols, (450) and (452) respectively, in this example are selectable and enable an associated category to collapse, selection of symbol (450) collapses the "alignment" category (410), and selection of symbol (452) collapses the "font" category (420). The "plus" symbols, (454) and (456) respectively, in this example are selectable and enable an associated category to expand. Selection of symbol (454) expands the "border" category (440), and selection of symbol (456) expands the "pattern" category (470). In one embodiment, a category is automatically displayed in the expandable state responsive to selection of the category. In the example shown in FIG. 4, the "pattern" category (470) does not have any format attributes selected. Accordingly, categories may be expanded or collapsed for efficient navigation and selection and/or de-selection of format attributes.

Figure 5:
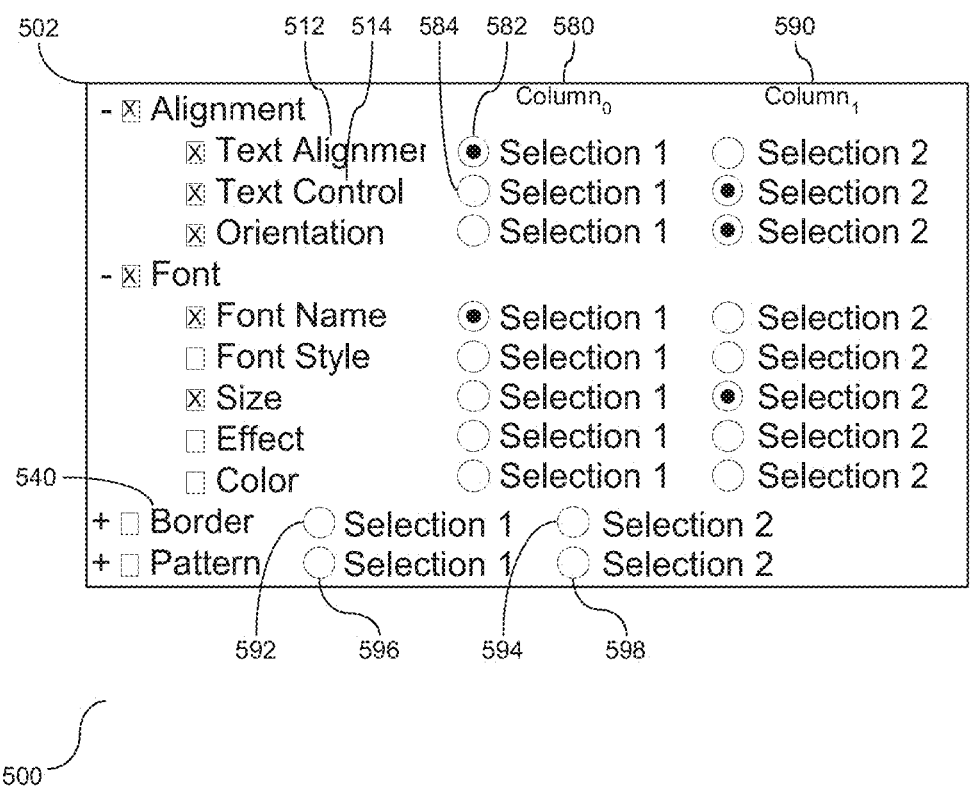
FIG. 5 depicts a block diagram illustrating one embodiment for merging format attributes from multiple sources.

The block diagram as shown and described in FIG. 4 may be implemented to enable selection from more than one source. FIG. 5 is a block diagram (500) depicting one example (502) for selection and/or de-selection of format attributes from multiple sources. FIG. 5 contains all the elements of FIG. 4 incorporated with like numbers. In this example, two sources have been selected for application to the destination. Two columns are presented, $column_0$ (580) and $column_1$ (590) respectively. $Column_0$ (580) contains selectable areas enabling the selection of format attributes captured from a selected first source and $column_1$ (590) contains selectable areas enabling the selection of format attributes captured from a selected second source. In one embodiment, one column is designated for each selected source. Accordingly, the captured attributes of each source are presented for selection.

As illustrated, $column_0$ (580) contains a selectable area (582) for each depicted format attribute. Similarly, each column contains a selectable area for each depicted format attribute. The selectable areas within each column enable a user to select a format attribute from each selected object. For example, format attribute "text alignment" (512) is shown with the area for "text alignment" for the first source (582) highlighted, signifying its selection. Similarly, the format attribute "text control" (514) is shown with the area for "text control" for the first source (584) not highlighted, signifying that it is not selected. When selectable area (582) is selected, the text alignment format is applied from the first source and the alignment format of the second source is not applied. Accordingly, the source of a format attribute may be selected for application of the format attribute of the source.

In one embodiment a selectable area is designated for each unexpanded category, as depicted by (592), (594), (596), and (598) respectively. Upon selection, a selectable category area will select all format attributes within a category for the selected source object. For example, selection of the unexpanded category (594) results in application of all of the format attributes within the "border" category (540) to the second source object. Accordingly, format attributes from multiples are selectively combined for application to a destination.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
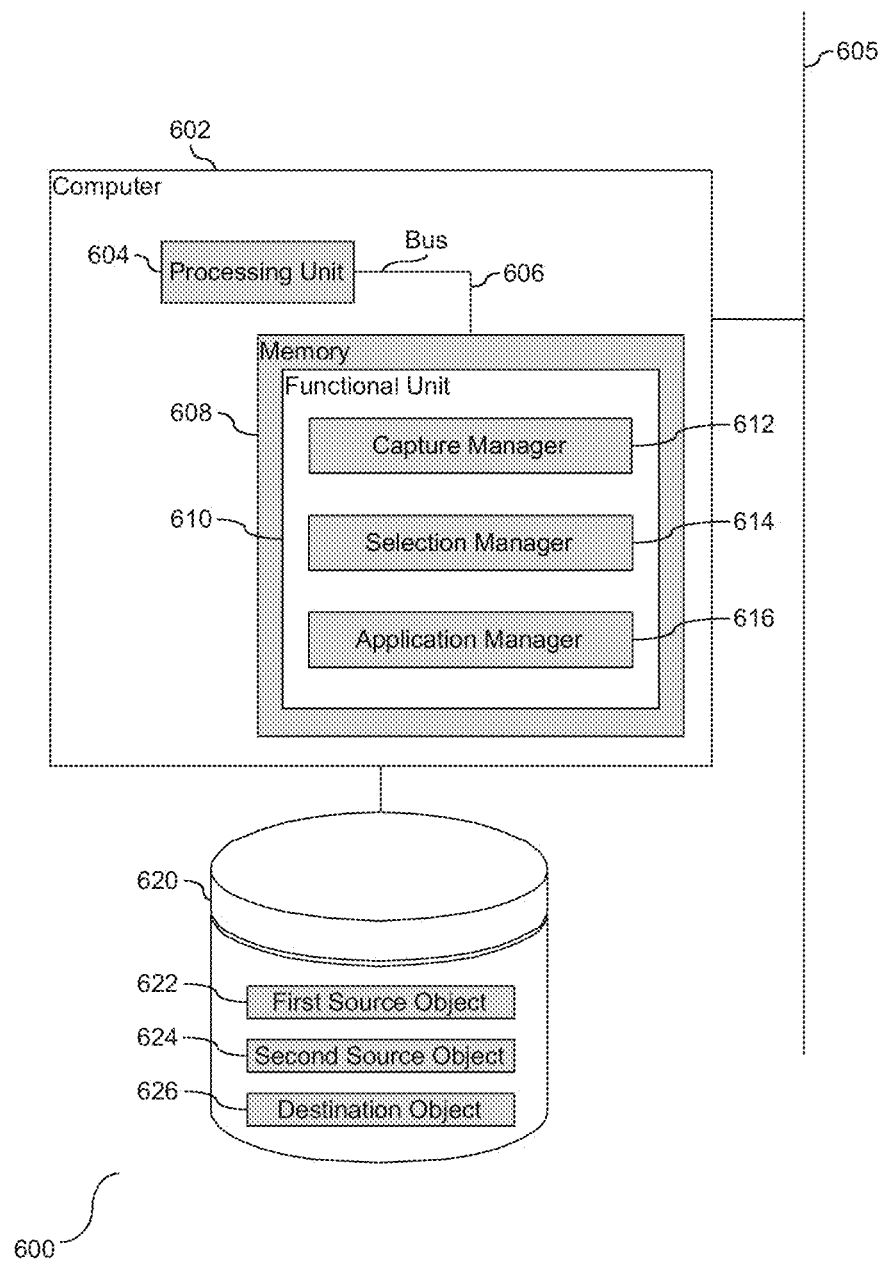
FIG. 6 depicts a block diagram illustrating a system for selective application of format attributes.

The processes shown in FIGS. 1-2 and supported in FIGS. 3-5 may be embodied as hardware components. FIG. 6 is a system (600) for capturing format attributes from one or more source objects, and tools to support manipulation of the data. A computer (602) is shown in communication with data storage (620). The computer has a processing unit (604) in communication with memory (608) across a bus (606). The computer (602) may further be in communication with any number of compute nodes across a network (605). A functional unit (610) is shown embedded within memory (608), and includes tools to select apply and format attributes of one or more source objects and to apply the selected attributes to one or more destination objects. The tools include, but are not limited to, a capture manager (612), a selection manager (614), and an application manager (616).

The capture manager (612) functions to capture attributes associated with a first source object (622), hereinafter referred to as first source, having a first format; the format may be an original format or an amended format. The format of the first source (622) is defined by one or more format attributes. One or more of the format attributes may be captured by the capture manager (612). In one embodiment, the capture manager (612) captures the format attributes of more than one source. The selection manager (614) functions to selectively copy one or more of the captured format attributes to content of a selected destination object (626). In one embodiment, this selection includes the selective copying of format attributes from multiple sources. In one embodiment, the selection manager (614) enables selection and/or de-selection of one or more format attributes from one or more sources to achieve a combination of selected attributes for application to one or more destinations. Where a format attribute is de-selected and/or not actively selected, the format attribute may be excluded from selection and further application. Accordingly, the capture manager (612) captures all the format attributes comprising the format of one or more sources, and the selection manager (614) facilitates selection among the format attributes of the source object(s) for further application.

Once selected, the format attributes have been selected, the combination forms a holistic object characterization, which may be applied to one or more destinations (626). The application manager (616), provided in communication with the selection manager (614), functions to apply the selected attributes as identified in the characterization, to the destination (626) as a destination format. In one embodiment, the format of the destination (626), subsequent to the application of the selected attributes, includes both the applied format attributes and additional format attributes previously contained by the destination format and unaffected by the applied format attributes. In one embodiment, the application manager (616) merges format attributes selected by the selection manager (614) from multiple source objects, (622) and (624) respectively, and applies the merged attributes to one or more destination objects (626). In another embodiment, the selection manager (614) selects and copies all of the captured attributes and the application manager (616) merges all of the captured attributes from each selected source object, (622) and (624) respectively, for application to one or more destination objects (626), also referred to herein as destination content. Accordingly, the application manager (616) applies the format attributes selected by the selection manager (614) to a destination as a destination format.

As identified above, the capture manage (612), selection manager (614), and application manager (616), are shown residing in the functional unit (610) of the computer (602). Although in one embodiment, the functional unit (610) and managers (612)-(616), respectively, may reside as hardware tools external to memory (608). In another embodiment, the managers (612)-(616) may be implemented as a combination of hardware and software. Similarly, in one embodiment, the managers (612)-(616) may be combined into a single functional item that incorporates the functionality of the separate items. As shown herein, the managers (612)-(616) are shown local to one computer system (602). However, in one embodiment they may be collectively or individually distributed across a shared pool of configurable computer resources and function as a unit to support interactive format manipulation and replication. Accordingly, the managers may be implemented as software tools, hardware tools, or a combination of software and hardware tools.

The described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit described above in FIG. 6 has been labeled with managers. The managers may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Figure 7:
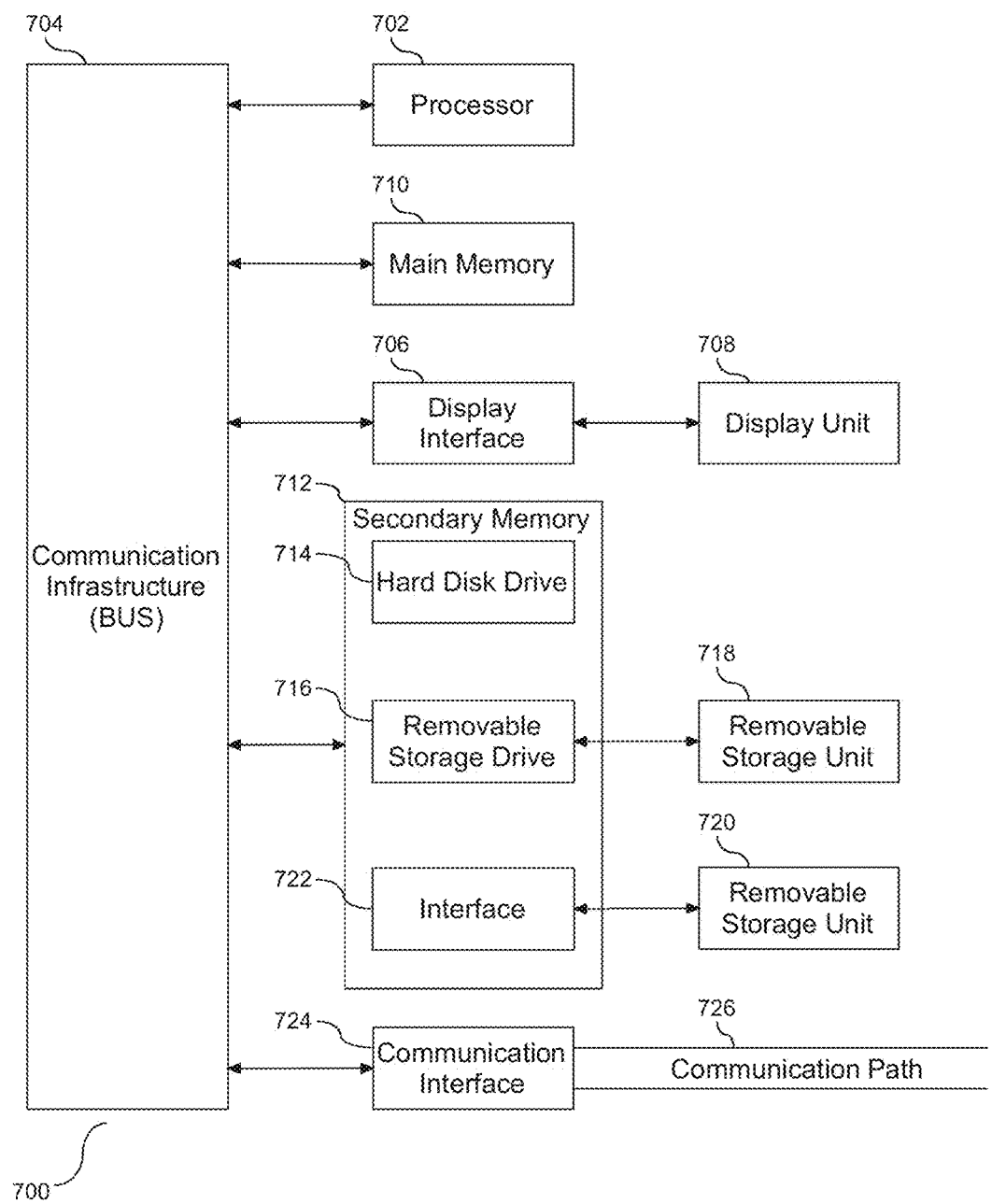
FIG. 7 depicts a block diagram showing a system for implementing an embodiment of the present invention.

Referring now to the block diagram (700) of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) (or alternative persistent storage device) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by a removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive or alternative persistent storage device (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising: capturing one or more attributes associated with formatting content of one or more sources, including capturing one or more first attributes associated with formatting first content of a first source;

presenting an interface to facilitate selection of the captured attributes, wherein the interface displays one or more listings of respective captured attributes, including a first listing of the captured first attributes, and wherein each listing comprises attributes organized into one or more respective categories;

selecting one or more elements from at least the first listing, wherein an element is selected from the group consisting of: an attribute, a category, and a combination thereof;

responsive to selecting a destination different from the source, copying each selected element;

and formatting content of the selected destination, including applying each copied element to the selected destination content;

capturing one or more second attributes associated with formatting second content of a second source, wherein the interface further displays a second listing of the captured second attributes;

selecting an element from the second listing;

wherein copying further comprises merging the selected first and second elements, and wherein the merged attributes are applied to the destination content.

2. The method of claim 1, wherein each captured attribute is initially selected, and wherein the selection of the elements comprises de-selecting at least one of the captured attributes.

3. The method of claim 1, wherein the interface is a graphical user interface (GUI).

4. The method of claim 1, further comprising collapsing the listing of attributes within a selected category.

5. The method of claim 1, further comprising expanding the listing of attributes within a selected category.

6. The method of claim 2, wherein at least one of the captured attributes is excluded from the destination.

* * * * *